(12) United States Patent
Fröberg Olsson et al.

(10) Patent No.: US 11,165,548 B2
(45) Date of Patent: Nov. 2, 2021

(54) ACKNOWLEDGEMENT SIGNALING

(71) Applicant: Telefonaktiebolaget LM Ericsson (publ), Stockholm (SE)

(72) Inventors: Jonas Fröberg Olsson, Ljungsbro (SE); Torsten Dudda, Aachen (DE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 28 days.

(21) Appl. No.: 16/488,391

(22) PCT Filed: Mar. 1, 2017

(86) PCT No.: PCT/SE2017/050192
§ 371 (c)(1),
(2) Date: Aug. 23, 2019

(87) PCT Pub. No.: WO2018/160108
PCT Pub. Date: Sep. 7, 2018

(65) Prior Publication Data
US 2020/0244424 A1 Jul. 30, 2020

(51) Int. Cl.
| H04L 1/16 | (2006.01) |
| H04L 1/18 | (2006.01) |
| H04W 28/04 | (2009.01) |
| H04L 1/06 | (2006.01) |
| H04L 5/00 | (2006.01) |
| H04W 24/04 | (2009.01) |

(52) U.S. Cl.
CPC .......... *H04L 5/0055* (2013.01); *H04L 1/0625* (2013.01); *H04L 1/1671* (2013.01); *H04L 1/1812* (2013.01); *H04L 1/1822* (2013.01); *H04W 24/04* (2013.01); *H04W 28/04* (2013.01)

(58) Field of Classification Search
CPC .......... H04W 72/1289; H04W 72/1278; H04L 27/3405; H04L 1/0625; H04L 1/1822
See application file for complete search history.

(56) References Cited

U.S. PATENT DOCUMENTS

| 8,341,483 B2 * | 12/2012 | Yokoyama | H04L 1/06 714/749 |
| 2009/0241002 A1 * | 9/2009 | Ko | H04L 1/1893 714/749 |

(Continued)

FOREIGN PATENT DOCUMENTS

WO 2018091228 A1 5/2018

OTHER PUBLICATIONS

International Search Report and Written Opinion dated Sep. 14, 2017 for International Application No. PCT/SE2017/050192 filed on Mar. 1, 2017, consisting of 11-pages.

*Primary Examiner* — Raj Jain
(74) *Attorney, Agent, or Firm* — Christopher & Weisberg, P.A.

(57) ABSTRACT

There is disclosed a method of operating a radio node in a Radio Access Network, RAN. The method includes transmitting acknowledgement signaling pertaining to at least two transmission data streams in which the acknowledgement signaling is determined based on performing a combined error evaluation pertaining to the at least two transmission data streams based on a combination indication obtained by the radio node. The present disclosure also pertains to related methods and devices.

20 Claims, 6 Drawing Sheets

(56) References Cited

U.S. PATENT DOCUMENTS

| | | | |
|---|---|---|---|
| 2010/0002619 A1* | 1/2010 | Hart | H04L 1/1845 370/315 |
| 2012/0087424 A1* | 4/2012 | Brown | H04L 1/1887 375/260 |
| 2013/0044722 A1* | 2/2013 | Kang | H04L 1/1861 370/329 |
| 2015/0085796 A1 | 3/2015 | Xu et al. | |
| 2015/0208403 A1* | 7/2015 | Takeda | H04L 5/0053 370/329 |
| 2015/0229444 A1 | 8/2015 | Webb et al. | |
| 2017/0126371 A1* | 5/2017 | Goransson | H04L 1/1896 |
| 2018/0212858 A1* | 7/2018 | Yang | H04L 43/0852 |
| 2020/0244424 A1* | 7/2020 | Froberg Olsson | H04L 1/1812 |

\* cited by examiner

ACKNOWLEDGEMENT SIGNALING

CROSS-REFERENCE TO RELATED APPLICATIONS

This application is a Submission Under 35 U.S.C. § 371 for U.S. National Stage Patent Application of International Application Number: PCT/SE2017/050192, filed Mar. 1, 2017 entitled "IMPROVED ACKNOWLEDGEMENT SIGNALING," the entirety of which is incorporated herein by reference.

TECHNICAL FIELD

The present disclosure pertains to wireless communication technology, in particular to methods and devices related to a Radio Access Network (RAN).

BACKGROUND

Wireless communication technology becomes more and more widely spread, and is adapted for an increasing number of use cases. Some use cases demand a high level of correctness of transmission, e.g. a low BLER (Block Error Rate), while requiring low latency. Current approaches, e.g. utilising acknowledgement signaling like HARQ technology, need to be improved upon to be able to cover such use cases.

SUMMARY

It is an object of the present disclosure to provide improved approaches related to acknowledgement signaling, e.g. for high reliability with low latency, without unduly limiting the flexibility of methods, systems and devices implementing them.

Accordingly, there is described a method of operating a (e.g., first) radio node in a Radio Access Network, RAN. The method comprises transmitting acknowledgement signaling pertaining to at least two transmission data streams. The acknowledgement signaling is determined based on performing a combined error evaluation pertaining to the at least two transmission data streams, wherein the performing the combined error evaluation is based on a combination indication obtained by the radio node.

Also, a (e.g., first) radio node for a Radio Access Network is disclosed. The radio node is adapted for transmitting acknowledgement signaling pertaining to at least two transmission data streams, wherein the acknowledgement signaling is determined based on performing a combined error evaluation pertaining to the at least two transmission data streams based on a combination indication obtained by the radio node. The radio node may comprise processing circuitry and/or radio circuitry, in particular a transmitter and/or a transceiver, and/or be adapted to utilise such circuitry, for such transmitting and/or for performing the evaluation. Alternatively, or additionally, the radio node may comprise a transmitting module for such transmitting and/or an evaluating module for performing the evaluation.

There may be considered a method of operating a (e.g., second) radio node in a Radio Access Network. The method comprises transmitting control signaling comprising a combination indication, the combination indication indicating whether acknowledgment signaling pertaining to at least one transmission data stream is to be based on a combined error evaluation pertaining to the at least one transmission data stream and at least one further transmission data stream.

Furthermore, there is described a (e.g., second) radio node for a Radio Access Network, RAN. The radio node is adapted for transmitting control signaling comprising a combination indication, the combination indication indicating whether acknowledgment signaling pertaining to at least one transmission data stream is to be based on a combined error evaluation pertaining to the at least one transmission data stream and at least one further transmission data stream. The radio node may comprise processing circuitry and/or radio circuitry, in particular a transmitter and/or a transceiver, and/or be adapted to utilise such circuitry, for such transmitting and/or for determining the combination indication. Alternatively, or additionally, the radio node may comprise a transmitting module for such transmitting and/or a determining module for determining the combination indication.

A (first) radio node may be implemented to include the features associated to a (second) radio node. Similarly, the methods of operating a (first) radio node and of operating a (second) radio node may be combined for operating one radio node. A (first) radio node may be any kind of radio node, but in particular be a wireless device or terminal or UE. A (second) radio node may be any kind of radio node, but in particular be a network node. If a radio node is a terminal, its transmission may be considered uplink transmission or sidelink transmission. If a radio node is a network node, its transmission may be considered downlink transmission.

Generally, a transmission data stream (or, shorter, data stream) may comprise one or more data elements. A data element may represent a data block, e.g. a transport block and/or MAC (Medium Access Control, a layer of a RAN) data structure. To each data element there may be assigned a data content and/or payload (which may be referred to simply as "data"), e.g. user data and/or control data. The data content of data elements of the same data stream may represent and/or consist of the same data, e.g. the same bit pattern. Additionally, a data element may comprise transport information, e.g. related to coding and/or error coding and/or mapping and/or modulation. Such transport information may be equal or different for the data elements of the same data stream. Different data elements (of the same data stream, or of different data streams) may be transmitted with the same Modulation and Coding Scheme (MCS), or in some variants may have different MCS. It may be considered that a data stream is associated to, and/or is defined by and/or in relation to a specific acknowledgement signaling process, e.g. a HARQ process or ARQ process. In the acknowledgement signaling process, data element/s having the same data content/payload (being of the same data stream) may be transmitted or retransmitted until they have been received correctly, e.g. as indicated by acknowledgement signaling. Different acknowledgment signaling processes may differ in for example regarding their process identifiers, and/or associated entities, e.g. HARQ and/or ARQ entities. If an acknowledgement signaling process has led to correct transmission of the associated data, the same acknowledgement signaling process may be (re-) used for transmitting different data (content) in a new data stream, the successfully transmitted stream/s being cancelled.

A transmission data stream may be considered a substream or part of a larger data stream, which may be associated to a specific bearer and/or logical or transport channel. The bearer or channel may be mapped to two or more acknowledgement signaling processes, which may handle pieces (in data blocks or data elements) of the larger stream as data stream, until a piece has been correctly decoded, and a new piece is handled in new data streams. It may be considered that acknowledgement signaling comprises signaling and/or one or more signals or messages associated to a data stream, e.g. signals or messages indicating whether the data stream has been correctly decoded or not. Such signaling may be referred to as part of the data stream for ease of reference, but pertains to the opposite communication direction the data elements of the stream are transmitted.

Acknowledgement signaling may be determined based on, and/or determining such may comprise, receiving one or more data streams, respectively one or more data elements of such stream/s, e.g. utilising a receiver and/or processing circuitry and/or a receiving module, which may be part of a radio node, or with which a radio node may be implemented. Alternatively, or additionally, acknowledgement signaling may be determined based on scheduling information indicating that one or more data streams and/or related data elements should be transmitted. Such scheduling information may for example be provided or transmitted by a radio node transmitting at least one of the data streams, and/or may be comprised in control information, e.g. Downlink Control Information. Scheduling information may be obtained by the radio node determining the acknowledgement signaling, e.g. received from another radio node, or scheduled itself, e.g. when configuring or scheduling uplink transmission or sidelink transmission of data stream/s for another node. Scheduling information may indicate a downlink grant and/or an uplink grant, which may configure downlink and/or uplink resources for reception or transmission by a configured wireless device or terminal. Acknowledgment signaling may in particular be based on, and/or represent, non-reception of one or more data elements, respectively may indicate such, e.g. as DTX signal instead of NACK. Non-reception may e.g. be determined based on scheduling information. Alternatively, or additionally, reception of one or more data elements without corresponding scheduling information (received and/or decoded) may be indicated, e.g. as a variant of DTX or similar signal. However, in some variants, non-reception of acknowledgement signaling, e.g. pertaining to one or more data streams and/or acknowledgement signaling processes, may be considered as DTX event, e.g. by the node receiving or expecting to receive such signaling.

Generally, acknowledgement signaling may comprise one or more bits for each data stream and/or acknowledgement signaling process.

Different transmission data streams may pertain to different HARQ (Hybrid Acknowledgement Repeat reQuest) processes, or different transmission data streams may pertain to different ARQ processes (Acknowledgement Repeat reQuest).

It may be considered that different data streams are transmitted on different channels and/or carriers and/or frequency bands, in particular on different carriers in a carrier aggregation and/or on different physical channels. In such cases, associated acknowledgement signaling entities may be different, even if process identifiers within a set of entities may be the same (e.g., numbered from 0 to 7 or 0 to 15 within each channel or relating to each carrier or aggregation). It may be considered that for data streams on multiple carriers, e.g. in a carrier aggregation, data streams of processes having the same number are combined for error evaluation based on the combination indication. In this case, it may be sufficient to indicate that combination is intended with only one bit (or one bit for each data stream).

Error evaluation may comprise decoding of error coding, in particular error detection and/or error determination pertaining to a data element associated to a transmission data stream. Error evaluation may generally comprise determining whether a data element has been scheduled and/or received, and/or whether the data of the data element is received and/or decoded correctly, e.g. based on error coding. Error evaluation may comprise soft combining of data elements, e.g. combining information and/or data from multiple data elements (e.g. representing the same data) to determine correctness and/or for decoding.

Combined error evaluation in particular may pertain to performing error evaluation for data elements from different data streams, wherein the data elements may have (or assumed to have, e.g. as indicated by the combination indication) the same data or data content or payload. Such combined error evaluation may comprise combining and/or soft-combining data elements from different data streams (e.g., at least one of each stream), and/or comparing such elements and/or associated data and/or error evaluation results pertaining to such data elements. Combined error evaluation may comprise passing information from one acknowledgement signaling entity (e.g., HARQ entity) to another, e.g. based on the combination indication. Such an entity may be associated to the respective process, and/or may be an (e.g., combining) entity assigned for the combined evaluation, in which case it may be considered that the entities associated to the data streams for which the combined error evaluation is performed each may pass such information to the combining entity. Information between entities may be passed utilising suitable interfaces, e.g. software and/or hardware interfaces.

Combined error evaluation may in general comprise comparing error detection and/or error determination results pertaining to data elements of different transmission data streams. It may be considered that combined error evaluation comprises performing error detection and/or error determination on different data elements and/or data streams separately, and then comparing the results. Alternatively, or additionally, combined error evaluation may comprise combining data streams and/or data elements of different data streams, and then performing error detection and/or determination on the combination.

Error detection may comprise detecting the presence of one or more errors in a data element and/or data stream, e.g. based on error detection coding. Error determination may comprise determining and/or locating and/or correcting for one or more errors, e.g. based on forward error coding and/or one or more other data elements of the data stream/s, which may already be received. Acknowledgement signaling may indicate acknowledgment if no error is detected and/or all errors have been corrected for and/or when a data stream and/or its associated elements have been decoded correctly (e.g., as determined in the framework or context of the error evaluation).

Generally, data elements of different transmission data streams may represent the same data content or data. In some alternatives, data elements may represent (at least partly) overlapping data or content, or equal data or content.

In some variants, the combination indication may comprise two signals transmitted on different channels and/or carriers.

Acknowledgement signaling may generally represent a result of the combined error evaluation. It may comprise two or more signals, which may be transmitted on different channels and/or carriers. Each signal may be associated to one acknowledgement signaling process and/or data stream.

In some alternatives, at least one signal may be associated to more than one acknowledgement signaling process and/or data stream, e.g. indicating a combined error evaluation result, and/or be transmitted on one carrier and/or channel and/or for one acknowledgement signaling process only. In this case, the signaling may comprise only one signal in total, which may represent the combined error evaluation result for all data streams. In some variants it may be considered that such acknowledgement signaling (e.g. is transmitted with equal content one more than one carrier and/or channel, e.g. in a carrier aggregation. Acknowledgement signaling may comprise different and/or individual and/or separate signals for different data streams and/or different acknowledgment signaling processes, allowing multiple-layered feedback (e.g., relating to DTX/ACK/NACK). Different or separate signals may be associated and/or transmitted with different messages, e.g. different control information messages, e.g. DCI messages or UCI messages. Different messages may be transmitted on the same or different channels and/or carriers.

It may be considered that the combination indication comprises a signal and/or message for each transmission data stream, e.g. for each transmission data stream on which the combined error evaluation is to be based on.

The combination indication may comprise a combination indicator transmitted with an acknowledgment process indicator. Such an indicator may represent and/or be implemented as a bit pattern comprising one or more bits. An indicator may be considered to represent a parameter.

Signaling, or a message, comprising a combination indication may be considered and/or implemented as one or more control information messages. For example, a Downlink Control Information (DCI) message and/or a scheduling message (which may schedule and/or indicate scheduling intention for a data element and/or stream related to the combination indication) may be considered examples of such control information messages. A message of, and/or comprising, acknowledgment signaling may generally also be considered a control information message, e.g. in the other direction of communication than the combination indication. Examples of such a control information message comprise Uplink Control Information (UCI) messages, and/or acknowledgement messages.

Control signaling may be considered signaling of, and/or comprising, control information. Control information may be provided in a control information message. Control information may comprise a combination indication, and in some variants in addition scheduling information like a grant (of uplink and/or downlink resource/s), e.g. for the downlink or downlink control information. In other cases, control information may comprise acknowledgement signaling (respectively, associated acknowledgement information, and in some variants in addition scheduling requesting information and/or measurement-related information, e.g. for the uplink or uplink control information.

Generally, a combination indication may indicate whether or not a data stream is to be combined (for combined error evaluation) and/or with which one or more other data streams it is to be combined.

A combination indication may be determined based on a reliability level and/or latency level (the term "transmission level" may be used for either or a combination of both). Such a level (or levels) may be represented or indicated by a corresponding indication or indicator, and/or be associated to or pertain to the data to be transmitted using the one or more data streams. A level or indication may be indicated directly/explicitly, or indirectly/implicitly. A reliability level may be indicated by, and/or represent, a desired and/or required error rate and/or error probability, for example a Block Error Rate (BLER), and/or indicate a maximum number of errors or some similar. A latency level may indicate a desired or required latency and/or response speed. A transmission level may for example be indicated by a quality of service requirement and/or indication, and/or the number of data streams associated to transmitting the data and/or a transmission mode. A transmission level may for example indicate Ultra Reliable Low Latency Communication (URLLC). There may be defined different transmission levels, with several levels of reliability and/or latency. The combination indication may be determined based on the transmission level indicated for the data. Examples of explicit/direct indication comprise one or more combination indicators, e.g. in signaling, e.g. comprising one or more messages. A combination indication, in particular a transmission level indication, may be provided for, and/or pertain to, a bearer and/or logical or transport channel, from which the data streams may be provided.

There may be considered a variant in which at least two acknowledgement signaling processes (e.g., HARQ processes) are logically paired, e.g. for multi-antenna transmissions and/or MIMO (Multiple-Input, Multiple-Output) operation, such if one data stream is associated to one specific process (e.g., having a specific identifier, like a number, e.g. 0 or 1), a second data stream handled in parallel is automatically associated to another specific process (e.g., 7 if the first is 0, and 8 if the first is 1, other number association are possible). Such process association may be predefined (according to a standard used) and/or preconfigured (e.g., being configured by a network/network node). A combination indication may indicate that data assigned to the process association is of a specific transmission level, such that for example depending on the indicated transmission level, the associated processes may be associated to or handle data streams with the same data content, or may be associated to or handle data streams with different data contents.

A combination indication or indicator may be specific to one or more data streams, and/or be transmitted in control signaling associated and/or specific to this/these streams. It may be considered that the combination indication comprises different combination indicators for different data streams, which may be transmitted in control signaling associated to streams individually. Such an indicator may for example indicate with which other stream/s the individual data stream is to be combined.

However, there may be considered variants in which a combination indicator pertains to several data streams. Such a combination indicator, which may be referred to as common indicator, may indicate a pair or group of data stream/s to be combined (subjected to a combined error evaluation). Such an indicator may include all data streams it is transmitted for (e.g., on related channels and/or carriers), or may exclude some.

A combination indication or a combination indicator may in general be provided as a single-, multi- or broadcast, the latter in particular for a common indicator. Indirect/implicit indication may be based on for example, transmission mode and/or operation condition, e.g. number of carriers and/or a transmission level indication provided, from which it may be determined which (or whether) data streams are to be combined. Alternatively, or additionally, a combination indication may be represented by indicated transport block size (TBS), which may be indicated in one or more DCI messages. For example, data streams for which the same TBS is indicated may be considered to be indicated for combined error evaluation. It should be noted that in some cases, two or more acknowledgment signaling processes may be paired or grouped, such that transmissions on them (with or without the same data content) are related or simultaneous, e.g. for multi-antenna applications. A combination indicator in such a case may indicate whether a pair or group of data streams are to be combined or not.

Obtaining information or an indication, e.g. scheduling information and/or a combination indication, may comprise receiving such from another radio node, e.g. a network node. Alternatively, or additionally, obtaining such may comprise determining and/or configuring such by the obtaining node itself. For example, a network node may determine scheduling information and/or a combination indication for uplink or downlink data streams, e.g. when performing scheduling.

There is also considered a program product comprising instructions causing processing circuitry to control and/or perform any of the methods described herein.

Moreover, there is described a carrier medium arrangement carrying and/or storing any of the program products described herein.

An acknowledgement signaling process may be a process of transmitting and/or retransmitting data, based on acknowledgement signaling, e.g. acknowledgement feedback like HARQ or ARQ feedback. Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) indication. It should be noted that there may be DTX on either side of a communication. The radio node determining and/or transmitting the acknowledgement signaling may not receive an expected data element of a data stream, and indicate this in the acknowledgement signaling as DTX, allowing more finely grained acknowledgment information. On the other hand, the radio node receiving acknowledgment signaling may not receive an expected acknowledgement signal (e.g., in one of the data streams), and treat this as a DTX event. Both kinds of DTX may be treated separately, e.g. as DTX1 and DTX2 or according to a different scheme.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. Acknowledgement signaling may comprise one or more bits (e.g., for ACK/NACK) for an acknowledgement signaling process, and/or comprise additional information, e.g. indicating that a data element was not received and/or scheduled.

Transmitting acknowledgement signaling may comprise encoding and/or modulating, Encoding and/or modulating may comprise error detection coding and/or forward error correction encoding and/or scrambling.

Transmitting acknowledgement signaling may be based on, and/or comprise, determining acknowledgement information pertaining to the one or more data elements. Determining such information may comprise performing an ARQ and/or HARQ process and/or determining correct reception of the data elements (and/or considering non-reception). Alternatively, or additionally, transmitting acknowledgement signaling may comprise and/or be based on receiving the data, respectively data elements, for example based on a configuration, which may be a downlink data configuration. Such a configuration may be configured by a network node. The configuration may (statically and/or dynamically, e.g. in part both) be valid for one, or more than one, time structure or TTI. However, in some cases, the configuration may be dynamically adapted for each time structure or TTI, e.g. as configured by a network node.

Acknowledgement signaling may be considered pertaining to downlink data if it comprises acknowledgement information pertaining to downlink data respectively the data element/s thereof. Downlink data may generally represent data transmitted on a downlink channel, e.g. subject to one or more ARQ or HARQ processes. A data element may in particular represent a (e.g., a single) data block (like a transport block), which may be associated to a specific ARQ/HARQ process. In particular, different data streams, respectively their data element/s, may be associated to different ARQ/HARQ processes (which may run in parallel).

Data elements of the data may be transmitted by the network node, and/or under control or monitoring by the network node, which may be adapted accordingly, and/or utilise its circuitry accordingly, and/or comprise a data transmitting module therefor. Generally, data elements may be associated to one or more different transmissions/transmission events and/or messages, in particular to transmissions at different times or different time structures or intervals, e.g. TTIs. The approaches described herein allow flexible acknowledgement/HARQ feedback for data elements received in different time structures/TTI. A UE may receive, and/or be adapted to receive and/or to utilise its circuitry to receive, the downlink data and/or the data elements, e.g. based on a configuration.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular acknowledgement signaling, may comprise a plurality of signals and/or messages, which may be transmitted on different carriers and/or be associated to different acknowledgement signaling processes, e.g. representing and/or pertaining to one or more such processes. An indication, in particular a combination indication, may comprise signaling and/or a plurality of signals and/or messages, which may be transmitted on different carriers and/or be associated to different acknowledgement signaling processes, e.g. representing and/or pertaining to one or more such processes.

A radio node may generally be considered a device or node adapted for wireless and/or radio (and/or microwave)

frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Error coding may comprise for example error detection coding (EDC) and/or forward error coding (FEC). Error coding may generally be handled (e.g., encoded and/or decoded) by processing circuitry of a radio node.

The coding (for error correction) and/or the error detection bits may be provided by performing error detection coding, in particular encoding, the size of the coding may represent or correspond to the number of error detection bits and may be referred to as coding length or error detection coding length. Error detection coding, in particular encoding, may be performed by a transmitting node and/or an EDC encoding module of the transmitting node. A coding may be represented by one or more codes and/or algorithm to be performed when coding. A coding for decoding may be complementary to a corresponding coding for encoding (and vice versa).

Analogously, the correction coding and/or the error correction bits may be provided by performing (forward) error correction coding, in particular encoding, the size of the coding may represent or correspond to the number of error correction bits and may be referred to as correction coding length or error correction coding length. Forward error correction coding, in particular encoding, may be performed by a transmitting node and/or an FEC encoding module of the transmitting node.

Encoding for error detection may comprise determining and/or calculating one or more EDC bits, in particular a predetermined number of EDC bits (corresponding to the coding length) and/or according to a chosen algorithm. In particular, encoding for error detection may comprise utilizing a CRC (Cyclic Redundancy Check) algorithm.

Encoding for forward error correction may comprise determining and/or calculating one or more FEC bits, in particular a predetermined number of FEC bits (corresponding to the correction coding length) and/or according to a chosen algorithm. In particular, encoding for forward error correction may comprise utilizing an error correcting algorithm or code, e.g. a convolutional code and/or a Hamming code and/or Reed-Solomon code and/or a Reed-Muller code and/or a turbo code, or any other suitable FEC code.

Decoding (for error detection coded data and analogously for FEC encoded data) may comprise utilizing a coding for decoding error encoded data, wherein the coding in particular may have a coding length. The coding may be configured, e.g. by a transmission node, and/or be pre-determined. Decoding error detection coding may comprise determining whether (or not) an error occurred when transmitting and/or decoding the data. Decoding error detection decoding and/or such determining may comprise determining a probability that one or more errors occurred (and/or a probability, that no error occurred), based on the error detection coding. This decoding may comprise comparing the probability (and/or corresponding parameter/s or a set of parameters) with a threshold (or corresponding threshold value). Decoding may be based on one or more data elements representing the same data, e.g. of the same data stream and/or of different data streams, e.g. as indicated by the combination indication.

Alternatively, or in addition to the above, there may be considered a method of operating a radio node in a RAN. The method may comprise transmitting data elements on two or more data streams, the data elements comprising the same data or content or payload. A radio node for a RAN, the radio node being adapted for such transmitting, and/or comprising radio circuitry (like a transmitter or transceiver) and/or processing circuitry, and/or a transmitting module, for such transmitting may be considered. Transmitting data elements may be based on a combination indication as described herein, and/or based on acknowledgement signaling, which may be received from another radio node and/or pertain to already transmitted data elements of the streams. The combination indication and/or acknowledgement signaling may be received by the radio node transmitting the data elements, e.g. utilising a receiving module, and/or radio circuitry (like a receiver or transceiver) and/or processing circuitry, thereof. The combination indication may for example be received in an uplink grant or other message, in particular in a DCI message. Transmitting data elements based on acknowledgement signaling may comprise retransmission of data elements, e.g. if the acknowledgment signaling indicates non-acknowledgement (or non-reception), or transmitting of (new or different) data elements, if acknowledgment is indicated.

In general, acknowledgement may be indicated by the acknowledgment signaling comprising one or more acknowledgment signals or bits (ACK), the number of such signals may be dependent on the use case, and/or by acknowledgement signaling representing and/or comprising one out of a set of acknowledgement combinations. Non-acknowledgement may be indicated by acknowledgement signaling representing and/or comprising one out of a set of non-acknowledgment combinations. The sets may be subsets of the set of all possible combinations of acknowledgement signals transmitted for a plurality of processes and/or data streams. Each signal may for example indicate ACK or NACK (or one or more other states, e.g. DTX) for associated process/es, and each combination may comprise more than one such signal. Which combination/s represent/s acknowledgement (indicating new data elements to be transmitted), and which non-acknowledgment (indicating retransmission) may be preconfigured (e.g., by higher-layer signaling) and/or predefined (e.g., according to a standard).

The approaches described herein allow flexible combination of data streams, e.g. to comply with reliability and/or latency requirements.

BRIEF DESCRIPTION OF THE DRAWINGS

The drawings are provided to illustrate concepts and approaches described herein, and are not intended to limit their scope. The drawings comprise.

DETAILED DESCRIPTION

In the following, reference is made to LTE technology, for illustration and comparison. However, the approaches described are not limited thereto, and may be applied to analogous devices, structures and channels of other technologies, e.g. in the context of 5G standards, in particular 3GPP New Radio technology (NR).

In many wireless communications systems, HARQ (Hybrid Automatic Repeat Request) re-transmission is a method to mitigate un-predicable interference and channel variations, and which is an example of an acknowledgement signaling process. For downlink, when a wireless device attempted to decode a data message, it transmits an indicator to the transmitter indicating whether the decoding was successful or not. When the transmitter receives an indicator indicating un-successful decoding, the transmitter typically performs a re-transmission of the data message which the receiver typically will combine with the original received transmission. The combining is known as soft combining, of which chase and incremental redundancy are two well-known variants. The combining will greatly increase the probability of successful decoding.

In LTE, the indicator indicating the result of a decoding attempt is known as a HARQ-ACK. For LTE, in some cases up to two transport blocks (two data messages) may be transmitted in each TTI (Transmission Time Interval), which means that the HARQ-ACK may consist of 2 bits, where each bit indicates success or un-success of a respective transport block (successful reception/decoding, or an error therein).

LTE is a standard in 3GPP family of wireless systems, which is highly optimized for MBB (Mobile BroadBand) traffic. The TTI (subframe) has 1 ms duration and the HARQ-ACK is, for FDD, transmitted in subframe n=4 for a data transmission in subframe n.

Carrier aggregation was introduced in Rel-11 of the 3GPP specifications to increase system and user throughput. With carrier aggregation, two carriers could be used simultaneously wherein the throughput is essentially doubled (provided both carriers have same carrier bandwidth). To enable doubled throughput for the same traffic class, one instance of the layers above MAC (Medium Access Control), i.e., RLC (Radio Link Control), PDCP (Packet Data Convergence Protocol) etc., will be serving one MAC instance with two separate HARQ entities, one for each carrier. This means that for each carrier, there are independent HARQ entities with each independent HARQ processes, representing different/independent data streams. Further, downlink assignments and uplink grants, representing scheduling information, are typically transmitted on a PDCCH (Physical Downlink Control Channel) on each of the carriers.

URLLC (Ultra-Reliable Low Latency Communication) is data service with extremely strict error and latency requirements. Error probabilities as low as $10^{-5}$ or lower and 1 ms end-to-end latency or lower are expected requirements.

5G is currently being studied by 3GPP and is targeting a wide range of data services including MBB and URLLC. For URLLC diversity and repetition schemes are proposed to meet the low error rate requirements. One such scheme is to utilize multiple carriers/data streams, wherein the same data is transmitted on the carriers/data streams. This may be accomplished in different levels of the protocol stack such as PDCP (Packet Data Convergence Protocol), RLC (Radio Link Control) and MAC (Medium Access Control).

In case of MAC is used therefor, the carrier aggregation framework is proposed to be used to provided diversity wherein the same TB (Transport Block), e.g. MAC PDU (Protocol Data Unit), is transmitted on both carriers, for each stream. This means that the probability that the TB is correctly received is increased, since only one of the transmissions on the multiple carriers needs to be correctly received. Furthermore, this method increases the robustness of the control signaling for downlink assignments and uplink grants as well as HARQ feedback, since the signaling occurs on both carriers. Another benefit would be that soft combining may be used between the carriers such as transmitting a first redundancy version on a first carrier and simultaneously transmit a second redundancy version on a second carrier wherein the receiver performs soft combining between the two carriers. If a TB has been received correctly, two new data streams may be transmitted using the two carriers.

It may occur that, if a UE has both MBB and URLLC traffic, that the transmissions on two carriers may need to dynamically switch between non-diversity transmission (for MBB, i.e. to boost throughput) and diversity transmission (for URLLC i.e. to increase robustness). This may be accomplished by reserving one or more HARQ processes for URLLC transmissions, but this causes overhead in HARQ process indication. This is due to the downlink (or uplink) assignment indicating which HARQ process is used and the number of bits required in the signaling depend on the HARQ feedback timing and processing delay in UE and on the network side. Hence, to achieve peak throughput for MBB, all HARQ processes need to be used. Otherwise, if some of the HARQ processes are reserved for URLLC, the number of bits in assignments need to be increased. This should be avoided.

It may also be desired to switch between non-diversity and diversity, e.g. in case when there is only URLLC (perhaps even MBB in some scenarios) traffic. When the radio conditions are good, diversity may not be needed and only causes additional overhead. Furthermore, there may also occur situations where diversity cannot (or, is undesired to) be used.

It is proposed, as one option, to provide a combination indication, e.g., a HARQ process pairing indicator, for example in downlink and/or uplink assignments, which may be provided with downlink control information, e.g. a DCI message.

Figure 1:
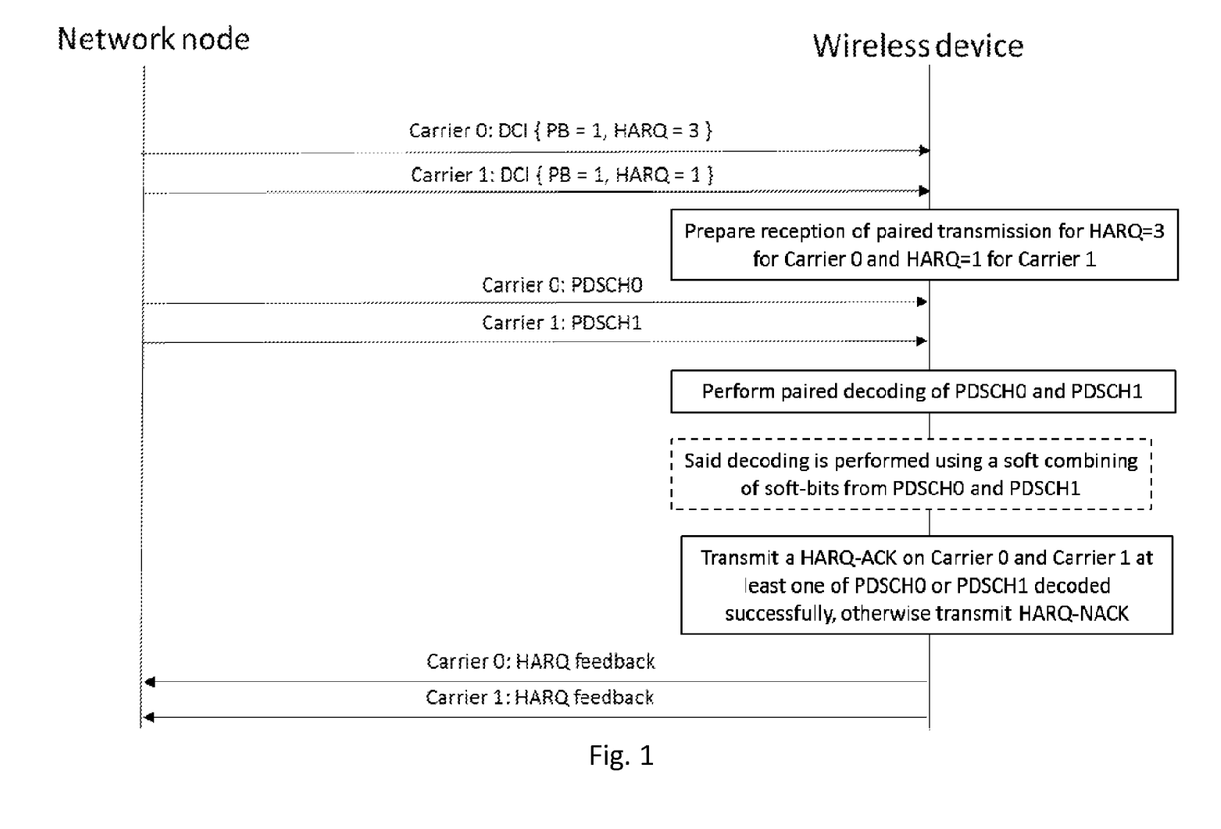
FIG. 1, showing exemplary signaling related to combined error evaluation.

A signaling diagram for a downlink embodiment is illustrated in FIG. 1.

The network node transmits a downlink assignment on two or more carriers assigning the wireless device two or more paired receptions, indicating two data streams to be combined for error evaluation. The assignments are carried in a DCI (Downlink Control Information) message transmitted on a downlink control channel, e.g. a PDCCH) on each of the carriers. In this example, a value "1" for PB (Paired Indicator Bit) indicates that the wireless device shall prepare for reception of a paired transmission, meaning in this context that soft bits for HARQ processes and associated data streams indicated in the DCI (HARQ=3 and HARQ=1 for respective carrier in the figure) can be soft combined. Upon reception of the paired transmissions (data elements, e.g. on PDSCH0 and PDSCH1), the wireless device performs a paired decoding. This paired decoding may in some examples of this embodiment be independent decoding for each of the carriers while in other examples the decoding is performed by combining soft bits for the indicated HARQ processes (HARQ=3 for Carrier® and HARQ=1 for Carrier1). In examples where soft combining is not used, the UE may transmit HARQ-ACK on all paired carriers if at least one of the paired transmissions are correctly received, otherwise HARQ-NACK is transmitted. In examples where soft combining is used HARQ-ACK, is transmitted on paired carriers if the soft-combining decoding is successful, otherwise HARQ-NACK is transmitted. It may be considered that ACK/NACK is only transmitted on one of the carriers, in particular if the HARQ processes are in a fixed association to each other, e.g. processes 0 and 7, 1 and 8, etc. Instead of pairing, for combined error evaluation, two carriers/HARQ processes/data streams, more than two thereof may be combined, e.g. in carrier aggregation scenarios with a corresponding large number of aggregated carriers (or even larger number of carriers in an aggregation).

The network node may be triggered by a pairing of HARQ feedback, which may also include DTX signaling.

The network node expects HARQ feedback for the paired downlink transmissions, wherein the received HARQ feedback may be interpreted taking into account that if wireless device correctly received all the assignments, then it transmits either HARQ-ACK or HARQ-NACK on all carriers.

For robustness enhancement, the network node may interpret a received (in case of two carriers) HARQ-ACK and a HARQ-NACK as HARQ feedback error on one of the carrier and hence take the robust decision to perform a re-transmission on both carriers. For robustness reasons, a received combination (DTX, HARQ-ACK), where DTX means that no HARQ feedback was detected/determined (e.g. due to no scheduling information or no reception). In some examples, this may result in the network node or network performing a re-transmission to be on the safe side. In such examples, only a received combination (HARQ-ACK, HARQ-ACK) will not result in re-transmissions. In more aggressive examples a received combination (DTX, HARQ-ACK) will be regarded as that the data was correctly received by the wireless device. In such examples, it is expected the probability that (HARQ-ACK, HARQ-ACK) →(DTX, HARQ-ACK) may be far more likely than (HARQ-NACK, HARQ-NACK)→(DTX, HARQ-ACK).

The examples described above are merely examples in the way the network node may act based upon the reception of the HARQ feedbacks. Especially in cases where more than two carriers are paired significantly more complex examples may be given.

With reference to FIG. 1, for downlink transmission of data streams, actions which may be performed may include:
Actions by the eNB (Network Node) for Downlink
 Indicate PB=1 in DL DCI for two processes
 Send duplicate data on HARQ processes with PB=1
 For Feedback, for processes with PB=1, receive feedback
  and assume for both processes 1,2
 DTX,ACK or ACK,ACK as ACK (new transmission)
 NACK,ACK, DTX,NACK, or NACK,NACK as NACK
  (retransmission)
Actions by the UE (Wireless Device/Terminal) for Downlink
 Receive two DL DCI with PB=1
 For processes with PB=1
 Combine the processes for error evaluation
 If decoding successful, send ACK,ACK
 If decoding not successful, send NACK,NACK A signaling diagram for an uplink case is illustrated in FIG. 2.

Similar to the downlink variant, the network node transmits an uplink assignment on two or more carriers, configuring with, or assigning to, the wireless device two or more paired uplink transmissions. The assignments are carried in a DCI (Downlink Control Information) message transmitted on a downlink control channel, e.g. a PDCCH) on each of the carriers. In this example a value "1" for PB (Paired Indicator Bit) indicates that the wireless device shall prepare a paired transmission meaning that soft bits for HARQ processes indicated in the DCI (HARQ=2 and HARQ=4 for respective carrier in the figure) can be soft combined (by the network node). After transmission of the uplink data of paired transmission (PUSCH0 and PUSCH1, data elements on two data streams comprising the same content), the network node receives the paired transmission and performs a paired decoding, which may in some examples of this embodiment be a soft combining of the soft bits for the paired HARQ processes (HARQ=2 and HARQ=4 for Carrier 0 and Carrier 1, respectively. As illustrated in FIG. 2, the network node may only need to send a re-transmission uplink assignment (representing acknowledgement signaling, in this case in the downlink) to the wireless device, if both of the paired decoding (in non-soft-combining case) of PUSCH0 and PUSCH1 fail. If the wireless device fails to receive one of the (paired) uplink assignments (treating it as DTX), the network node may only receive a subset of the expected paired transmissions. Also, for this case, if decoding succeeds, the network node may refrain from transmitting a re-transmission uplink assignment.

Figure 2:
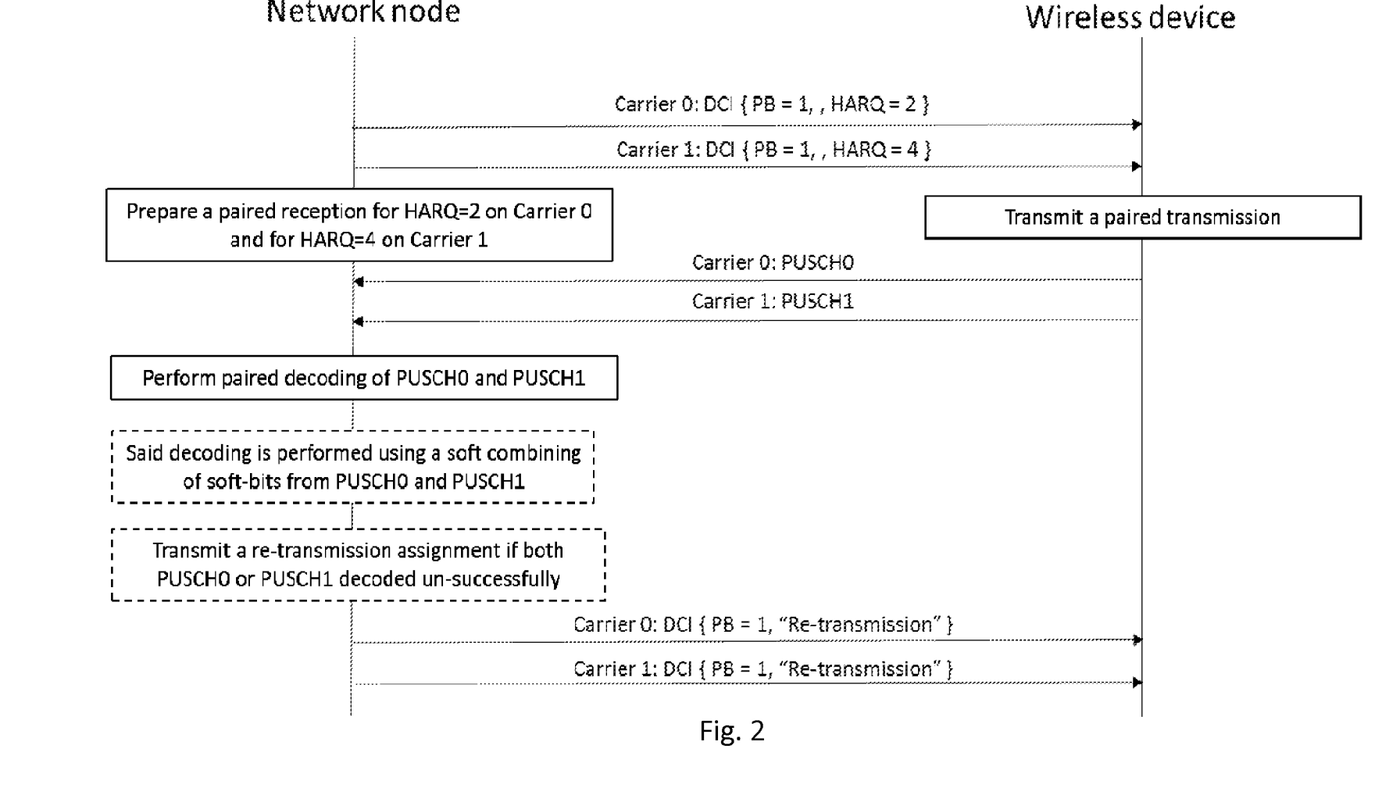
FIG. 2, showing another exemplary signaling related to combined error evaluation.

With reference to FIG. 2, for uplink transmission of data streams, actions which may be performed may include:
Actions by the eNB for Uplink
  Indicate PB=1 in UL DCI for two processes
  For processes with PB=1, receive data, combine in decoding, and assume for both processes 1,2
  Combine the processes for error evaluation
  If decoding successful, send ACK,ACK
  If decoding not successful, send NACK,NACK
Actions by the UE for Uplink
  Receive two UL DCI with PB=1
  Send duplicate data on HARQ processes with PB=1
  For feedback, for processes with PB=1, receive feedback, and assume for process 1,2
  UL DCI DTX, UL DCI indicating NACK, or NACK, NACK as NACK
  UL DCI DTX, UL DCI DTX as ACK (i.e. nothing and wait)

The paired HARQ process indication (combination indication) may be indicated implicitly, in particular the indication of which processes are paired may be implicit. The network or network node can configure that specified pairs of PDCCH locations constitute a process pair for combined error evaluation. As an example, this configuration can be done with RRC signaling. As an example, cross-carrier scheduling may be used for the two carriers, and two positions in the PDCCH (two locations in the search space) of the primary carrier may constitute a HARQ process pair, if one of the PDCCH is used to schedule on a secondary carrier. In another example, same-carrier scheduling is used, and one specific PDCCH position on the primary carrier combined with another specific PDCCH position on the secondary carrier constitute a HARQ process pair.

The PDCCH pair should have the same aggregation level if on the same carrier, but can otherwise be on any location in the search space. If the PDCCH search space is enumerated 1, . . . , N on carrier A and B, a pair can be defined as AXY or AXBY, where X, Y is any N.

In a variant, a TBS (Transport Block Size) is used to indicate a HARQ process pair. A UE receiving two DCI messages with the same TBS should consider them as constituting a HARQ process pair.

Explicit indication may be preferred in some embodiment due to that it imposes less restrictions for the scheduler. Using a 1-bit field in the DCI may indicate if the HARQ process should be paired with another HARQ process in a DCI on another carrier.

Another way to explicitly indicate the pairing/coupling of two HARQ processes may be done via radio resource control (RRC) configuration. Thereby a mapping, e.g. a bitmap or bit-matrix or lists of coupled HARQ process IDs (from same or different HARQ entities) is provided by RRC signaling. This mapping is used by the MAC transmitter to identify which HARQ processes are used for duplicate transmission, and by the MAC receiver to identify which HARQ processes are used for duplicate reception. As described above, soft combining and HARQ feedback generation and interpretation of HARQ feedback reception may be done jointly, according to the mapping as well.

In some embodiments RRC configuration and explicit indication using a field in the DCI are used in combination. For example, if the UE is configured with e.g. four carriers C1, C2, C3 and C4 for transmissions, a 2-bit pairing indicator may indicate a pairing configuration according to Table 1.

TABLE 1

Pairing indicator indicating pairing configuration

| Pairing indicator | Description |
| --- | --- |
| 00 | Not a paired transmission |
| 01 | Pairing configuration #1 |
| 10 | Pairing configuration #2 |
| 11 | Paring configuration #3 |

The pairing configurations may for example be configured to the UE according to:
  Configuration #1: Pairing of HARQ processes of C1 and C2
  Configuration #2: Pairing of HARQ processes of C3 and C4
  Configuration #3: Pairing of HARQ processes of C1, C2, C3 and C4

In this example the pairing for Configuration #3 is weak in the sense that if one DCI on one of carriers indicate "00" while the other three DCIs indicate "11" the UE interprets this as that the HARQ processes of three of the carriers are paired, while the HARQ process for remaining carrier is not paired. The UE may dynamically be indicated (configured) paired and non-paired transmissions on the four carriers, where there may simultaneously be two paired transmissions such as
  First paired transmission: C1 and C2 (DCI on C1 and C2 indicate "01")
  Second paired transmission: C3 and C4 (DCI on C3 and C4 indicate "10")

Furthermore, the UE may also be dynamically be indicated a 4-carrier paired transmission by indicating "11" in the DCIs on the four carriers, or a 3-carrier paired transmission by indicating "11" on three of the carriers but "00" on one of the carriers indicating a transmission that is not paired.

Scenarios related to logical channels may be considered.

It may be configured per logical channel, whether duplicate transmissions are allowed or not. Some logical channel may thus not be considered for transmission (within the logical channel prioritization procedure), in HARQ processes for which the PB bit is set to pairing.

Data from different logical channels is discussed in the following.

In one solution to provide diversity in carrier aggregation by duplicate transmissions, the duplicate data may be provided on different logical channels (i.e. RLC instances). In this case, the HARQ pairing bit indicates whether data from both logical channels should/must be transmitted within the current TTI, or whether data only from one of the logical channels should be transmitted.

An indication that a first HARQ process for a first carrier is paired with a second HARQ process for a second carrier wherein "paired" means that the soft-values of first and second HARQ process may be soft-combined in the decoding.

Figure 3:
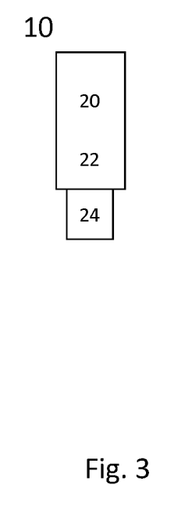
FIG. 3, showing an exemplary wireless device representing a radio node.

FIG. 3 schematically shows a terminal or wireless device 10, which may be implemented as a UE (User Equipment). Terminal 10 comprises processing circuitry (which may also be referred to as control circuitry) 20, which may comprise a controller connected to a memory. Any module of the terminal, e.g. a transmitting module or receiving module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal 10 may generally be adapted to carry out any of the methods for operating a terminal or UE disclosed herein; in particular, it may comprise corresponding circuitry, e.g. processing circuitry, and/or modules.

Figure 4:
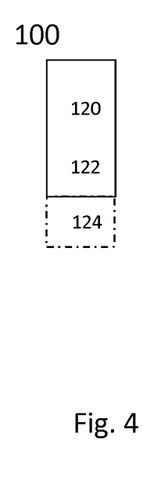
FIG. 4, showing an exemplary network node representing a radio node.

FIG. 4 schematically show a network node 100, which in particular may be an eNB, or gNB or similar for NR. Network node 100 comprises processing circuitry (which may also be referred to as control circuitry) 120, which may comprise a controller connected to a memory. Any module, e.g. transmitting module and/or receiving module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

Figure 5:
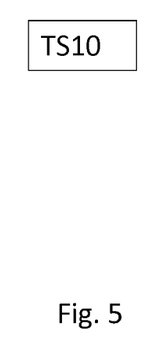
FIG. 5, showing an exemplary method of operating a radio node.

FIG. 5 shows a diagram for an exemplary method of operating a radio node. The method comprises an action TS10 of transmitting acknowledgement signaling pertaining to at least two transmission data streams, wherein the acknowledgement signaling is determined based on performing a combined error evaluation pertaining to the at least two transmission data streams based on a combination indication obtained by the radio node.

Figure 6:
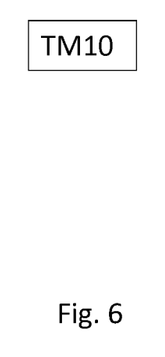
FIG. 6, showing an exemplary radio node.

FIG. 6 shows a schematic of an exemplary radio node. The radio node may comprise a transmitting module TM10 for performing action TS10.

In the context of this disclosure, HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK//NACK information or feedback (or shorter HARQ-ACK information or feedback or HARQ information or feedback or just HARQ) may include transmitting a signal/bit indicating whether a transport block of data received by the terminal has been receiver correctly or not. HARQ and/or determining HARQ may include decoding and/or error detection procedures to determine correct reception. There may be defined a number of HARQ processes with associated HARQ ids or numbers, which may refer to individual data streams and/or associated data elements; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier, e.g. dependent on the rank used. Generally, HARQ feedback may be transmitted (and/or determined, e.g. based on received signals and/or transport blocks and/or data and/or HARQ process identifiers) by a terminal, and/or a terminal may be adapted for, and/or comprise a HARQ module for, determining (e.g., as mentioned above) and/or transmitting HARQ feedback, in particular based on and/or using a configuration and/or a modulation configured, e.g. a modulation determined and/or configured as described herein. Transmitting HARQ may generally be performed on a UL control channel, e.g. PUCCH.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE.

A resource generally may represent a time-frequency resource, on which signaling according to a specific format may be transmitted and/or be intended for transmission. The format may comprise one or more substructures, which may be considered to represent a corresponding sub-resource (as they would be transmitted in a part of the resource).

Control information or a control information message or corresponding signaling may be transmitted on a control channel, e.g. a physical control channel, which may be a downlink channel or uplink channel. For example, the combination indication may be signaled by a network node on PDCCH (Physical Downlink Control Channel) and/or a PDSCH (Physical Downlink Shared Channel) and/or a HARQ-specific channel. Acknowledgement signaling may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

The term transmission time interval (TTI) may correspond to any time period over which a physical channel can be encoded and optionally interleaved for transmission. The physical channel may be decoded by the receiver over the same time period (TO) over which it was encoded. Examples of TTI comprise short TTI (sTTI), transmission time, slot, sub-slot, mini-slot, mini-subframe etc. A TTI may comprise a one or more symbol time intervals, and/or one or two slot time intervals, wherein e.g. 7 symbol time intervals may correspond to a slot time interval. Time interval-related terms may be considered to follow 3GPP nomenclature. A mini-slot or shortened slot or short TTI may correspond to a plurality of symbol time intervals, e.g. 2 or 3 or 4 or 5 or 6 or 7 symbol time intervals.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node. A network node may utilise, and/or be adapted to utilise, its circuitry/ies for configuring.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency space and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency space and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

A carrier may generally represent a frequency range or band. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency space.

It should be noted that the term "radio" in this disclosure may be considered to pertain to wireless communication in general, and may also include wireless communication utilising microwave frequencies.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink. Acknowledgement signaling, as well as signaling of an acknowledgement position indication may be considered examples of SCI, albeit in different directions of communication between participants. In particular, acknowledgement signaling may be considered to be in response to other control signaling (e.g., configuring control signaling), and thus be referred to as response control signaling. Configuring control signaling generally may configure a UE, e.g. schedule resources and/or a resource pool. Signaling of an acknowledgment position indication may be considered an example of configuring control signaling.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects Some useful abbreviations comprise:

| Abbreviation | Explanation |
|---|---|
| ACK | Acknowledgment |
| ARI | ACK/NACK Resource Indicator |
| CCE | Control Channel Element |
| DCI | Downlink Control Information |
| DL | Downlink |
| DTX | Discontinued Transmission |
| HARQ | Hybrid Automatic Repeat Request |
| MIMO | Multiple Input Multiple Output |
| NACK | Negative Acknowledgment |
| PAPR | Peak to Average Power Ratio |
| PDCCH | Physical Downlink Control Channel |
| PUCCH | Physical Uplink Control Channel |
| RRC | Radio Resource Control |
| UL | Uplink |

The invention claimed is:

1. A method of operating a radio node in a Radio Access Network, RAN, the method comprising:
transmitting acknowledgement signaling pertaining to at least two transmission data streams, the acknowledgement signaling being determined based on performing a combined error evaluation pertaining to the at least two transmission data streams based on a combination indication obtained by the radio node.

2. A radio node for a Radio Access Network, RAN, the radio node being configured to:
transmit acknowledgement signaling pertaining to at least two transmission data streams, the acknowledgement signaling being determined based on performing a combined error evaluation pertaining to the at least two transmission data streams based on a combination indication obtained by the radio node.

3. Method A method of operating a radio node in a Radio Access Network, RAN, the method comprising:
transmitting control signaling comprising a combination indication, the combination indication indicating whether acknowledgment signaling pertaining to at least one transmission data stream is to be based on a combined error evaluation pertaining to the at least one transmission data stream and at least one further transmission data stream.

4. The method according to claim 3, where different transmission data streams pertain to different HARQ processes, or different transmission data streams pertain to different ARQ processes.

5. The method according to claim 3, wherein different transmission data streams are transmitted on at least one of:
different channels;
carriers;
frequency bands;
different carriers in a carrier aggregation; and
different physical channels.

6. The method according to claim 3, wherein error evaluation comprises at least one of error detection and error determination pertaining to a data element associated to a transmission data stream.

7. The method according to claim 3, wherein combined error evaluation comprises comparing at least one of error detection and error determination results pertaining to data elements of different transmission data streams.

8. The method according to claim 3, wherein data elements of different transmission data streams represent a same data content.

9. The method according to claim 3, wherein acknowledgement signaling comprises a plurality of signals transmitted on at least one of different channels and carriers.

10. The method according to claim 3, wherein the combination indication comprises two signals transmitted on at least one of different channels and carriers.

11. A radio node for a Radio Access Network, RAN, the radio node being configured to:
transmit control signaling comprising a combination indication, the combination indication indicating whether acknowledgment signaling pertaining to at least one transmission data stream is to be based on a combined error evaluation pertaining to the at least one transmission data stream and at least one further transmission data stream.

12. The method according to claim 1, where different transmission data streams pertain to different HARQ processes, or different transmission data streams pertain to different ARQ processes.

13. The method according to claim 1, wherein different transmission data streams are transmitted on at least one of:
different channels;
carriers;
frequency bands;
different carriers in a carrier aggregation; and
different physical channels.

14. The method according to claim 1, wherein error evaluation comprises at least one of error detection and error determination pertaining to a data element associated to a transmission data stream.

15. The method according to claim 1, wherein combined error evaluation comprises comparing at least one of error detection and error determination results pertaining to data elements of different transmission data streams.

16. The method according to claim 1, wherein data elements of different transmission data streams represent a same data content.

17. The method according to claim 1, wherein acknowledgement signaling comprises a plurality of signals transmitted on at least one of different channels and carriers.

18. The method according to claim 1, wherein the combination indication comprises two signals transmitted on at least one of different channels and carriers.

19. The method according to claim 1, wherein the combination indication comprises a signal for each transmission data stream.

20. The method according to claim 1, wherein the combination indication comprises a combination indicator transmitted with an acknowledgment process indicator.

* * * * *